United States Patent [19]

Merle

[11] Patent Number: 4,592,452
[45] Date of Patent: Jun. 3, 1986

[54] WHEEL BRAKE COOLING APPARATUS FOR AIRCRAFT

[76] Inventor: Julius Merle, 2 Fabry St., Botany, New South Wales 2019, Australia

[21] Appl. No.: 491,203

[22] PCT Filed: May 13, 1981

[86] PCT No.: PCT/AU81/00058
§ 371 Date: Jan. 13, 1983
§ 102(e) Date: Jan. 13, 1983

[87] PCT Pub. No.: WO82/04108
PCT Pub. Date: Nov. 25, 1982

[51] Int. Cl.[4] .................................... F16D 65/847
[52] U.S. Cl. ........................... 188/264 AA; 188/71.6; 192/70.12; 192/113 A; 301/6 CF
[58] Field of Search .............. 188/71.6, 264 R, 264 A, 188/264 AA; 192/113 A, 70.12; 301/6 CS, 6 CF

[56] References Cited

U.S. PATENT DOCUMENTS

| | | | |
|---|---|---|---|
| 3,251,437 | 5/1966 | Moyer et al. | 192/113 A |
| 3,301,357 | 1/1967 | Cussons et al. | 301/6 CS X |
| 3,664,467 | 5/1972 | Lucien et al. | 192/113 A X |
| 3,734,247 | 5/1973 | Buckley | 188/264 A |

Primary Examiner—George E. A. Halvosa
Attorney, Agent, or Firm—Darby & Darby

[57] ABSTRACT

A wheel brake cooling apparatus for aircraft comprises a clamp assembly (14) for attachment to an aircraft tire (12), a duct (22) with a seal (30) which mates with the wheel hub (2) and contains an axial flow fan (32), the duct being suspended from clamp assembly by a hooked assembly (18) fixed to struts (36) which brace the duct. When activated, the fan draws air through the wheel brakes and wheel hub preventing tire damage after high energy stops.

12 Claims, 3 Drawing Figures

WHEEL BRAKE COOLING APPARATUS FOR AIRCRAFT

BACKGROUND OF THE INVENTION

This invention concerns an aircraft wheel brake cooling apparatus.

When large aircraft make high energy stops that is they use perhaps reverse thrust and maximum application of the wheel brakes the latter heat up considerably and due to the mass of the brake assembly and associated wheel and the good conductivity to the aircraft tire there follows when the aircraft is at rest a dangerous increase in tire pressure which must be relieved. Deflation of the tires is hazardous because of the possibility that the two bolted halves of the wheel may burst apart while deflation is being attempted. The brakes may not cool to ambient for two hours.

If the aircraft is scheduled to take off shortly after landing which is common on short routes the brakes will be subject to a further application before cooling adequately from the high energy stop.

OBJECTIVE AND SUMMARY OF THE INVENTION

This invention seeks to provide an apparatus which reduces the risk of damage to the wheel and tire by overheating during the period following a high energy stop.

This invention provides a wheel brake cooling apparatus for aircraft comprising a clamp assembly for attachment to an aircraft tire, a duct adapted to be clamped by the clamp assembly against an aircraft wheel upon which the tire is fitted, and a fan arranged, when activated, to draw cooling air through the wheel brake assembly via the duct.

A clamp assembly may comprise a tire-straddling, U-shaped frame with a first tire engaging pad for one sidewall of the wheel and a second tire engaging pad for the opposite side wall and means to clamp the pads against the tire. The frame may be made of a major part, the length of which exceeds the greatest sidewall to sidewall width of the tire, which part carries an inwardly directed pad for engaging one sidewall, a minor part which is pivoted to the major part, which minor part carries a complementary pad for engaging the opposite sidewall and a lever operated linkage for clamping the pads on the parts of the frame to the tire. The duct may be of circular cross-section and may have a ring seal at the front edge thereof in order to mate with the wheel hub. Preferably the fan is an axial flow fan supported in a cylindrical housing of a smaller cross-sectional area than the duct and the duct may extend from the housing on the input side of the fan. The duct may be releasably attached to the clamp assembly by a hook assembly which affords pivotal connection between the frame and the duct, the hook assembly being of adjustable length so as to permit the duct to mate closely with the wheel.

BRIEF DESCRIPTION OF DRAWINGS

One embodiment of the invention is now described by way of example with reference to the accompanying drawings wherein.

DESCRIPTION OF THE PREFERRED EMBODIMENT

Figure 1:
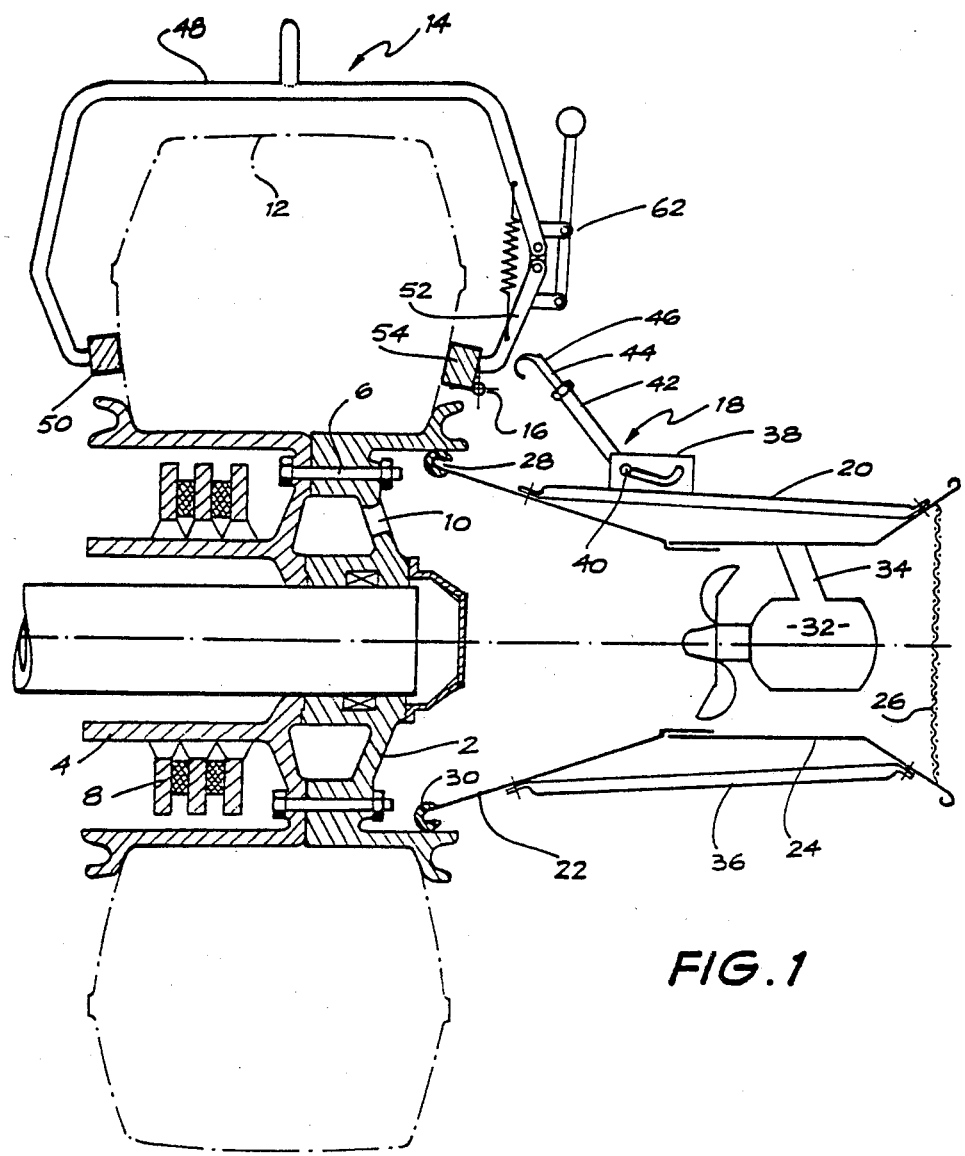
FIG. 1 is a diagrammatic section of the apparatus and the aircraft wheel to which it is applied

Referring to FIG. 1, the aircraft wheel has two hub sections 2, 4 clamped together by bolts 6. A multiple disc brake assembly 8 is located within hub section 4. Hub section 12 is pierced by cut-outs 10. The wheel supports a tire 12. A frame 14 straddles the tire 12 and crossbar 16 thereon supports a hook assembly 18 which is welded to the struts 20 of the duct 22. The duct is a sheet aluminium frustrum which coaxially overlaps an aluminium motor housing 24 the open end of which is protected by a grid 26. The inlet end of the frustrum has a rolled edge 28 which is protected by a rubber seal 30. An axial flow fan 32 is mounted within the housing 24 on arms 34 (only one shown) and is supplied with 115 v DC from a ground supply or from the aircraft generators. The fan produces a flow of 1400 cfm. The duct is stiffened by six tubular struts 36. The hook assembly 18 welded to the upper pair of struts consists of two slotted plates 38 which locate a pin 40 and a pair of tubes 42 each provided with adjustable screws 44 and hooks 46 for engaging cross bar 16.

Figure 2:
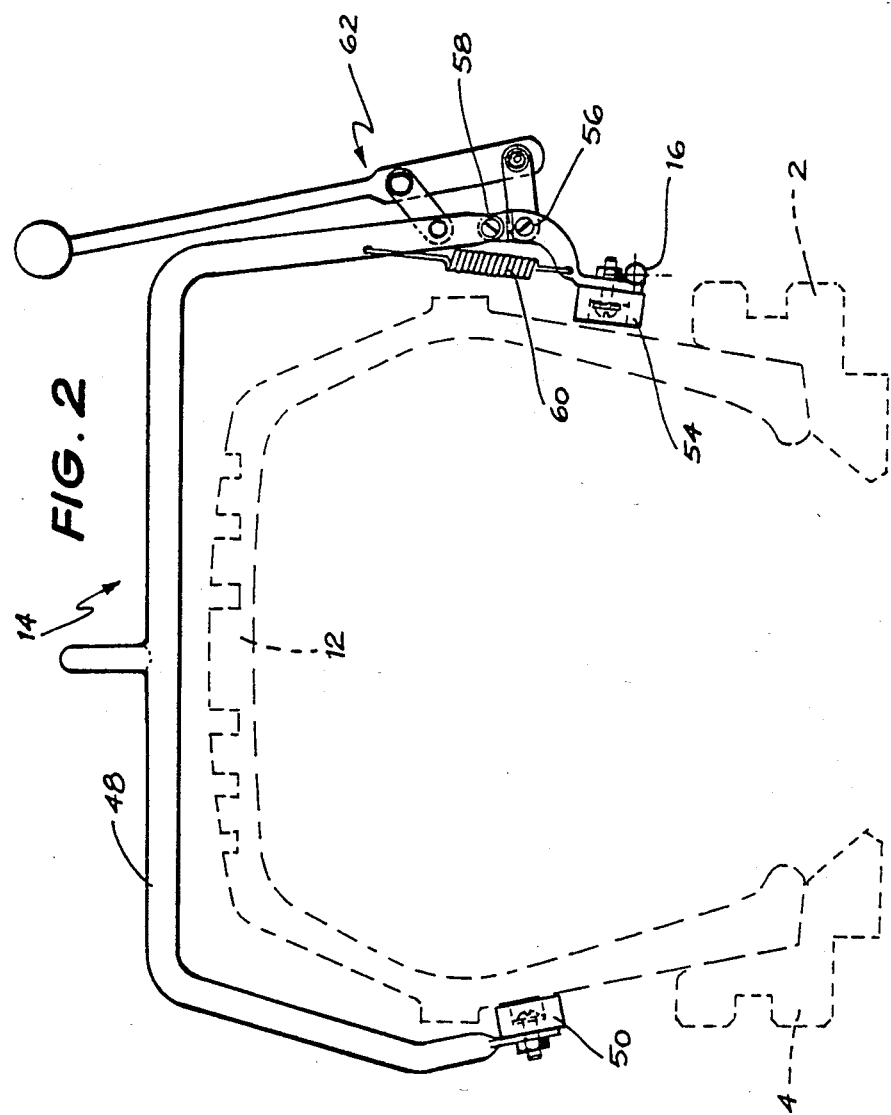
FIG. 2 is a side view of the clamp assembly
Figure 3:
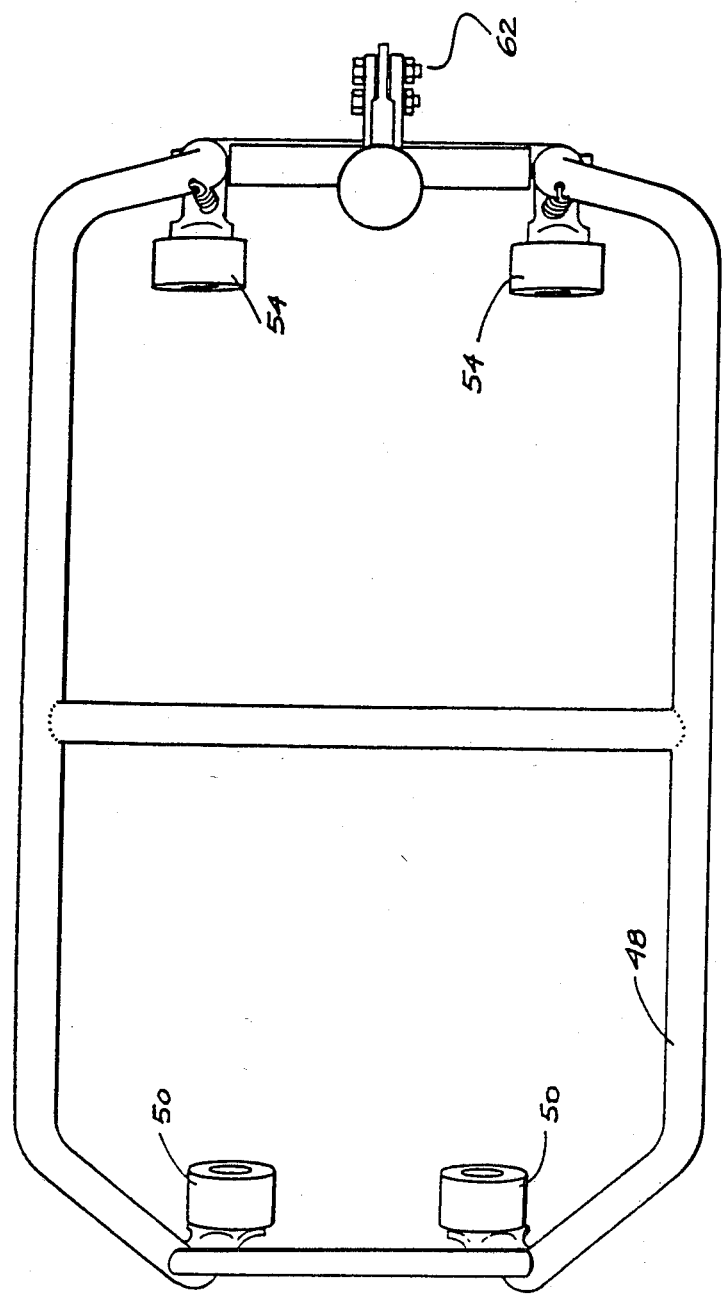
FIG. 3 is a plan of the clamp assembly.

Referring now to FIGS. 2 and 3 the clamping frame 14 consists of a major tubular part 48 provided with a pair of pads 50 which abut a sidewall of the tire 12. A minor part 52 of the frame carries complementary pads 54. The major and minor parts of the frame are pivotally connected by pins 56, 58 and normally urged into a clamping position by spring 60 but are openable by use of the lever and linkage 62. After a high energy stop the discs may reach 850° F. The clamp assembly is fitted to the tire and the duct sealed to the wheel. Air is drawn through the cut outs creating an air stream over the discs which cool rapidly in the first five minutes. Twenty minutes is generally required to reduce the wheel mass to ambient.

We have found the advantages of the apparatus to be
1. Ease of use due to lightness of construction
2. Adaptability to different sizes of tires
3. The apparatus can be applied from positions fore and aft of the wheel so that personnel need not stand in line with the direction of separation of the hubs.
4. The rapid cooling reduces the risk of distortion in the brakes.

I claim:

1. A wheel brake cooling apparatus for aircraft comprising a clamp assembly for attachment to an aircraft tire, a duct adapted to be clamped by the clamp assembly against an aircraft wheel upon which the tire is fitted, and a fan arranged, when activated, to draw cooling air through the wheel brake assembly via the duct, wherein the clamp assembly comprises a tire-straddling, U-shaped frame with a first tire engaging pad for one sidewall of the wheel and a second tire engaging pad for the opposite side wall and means to clamp the pads against the tire, the frame being made of a major part, the length of which exceeds the greatest sidewall to sidewall width of the tire, which part carries an inwardy directed pad for engaging one sidewall and a minor part which is pivoted to the major part, which minor part carries a complementary pad for engagig the opposite sidewall and a lever operated linkage for clamping the pads on the Two parts of the frame to the tire.

2. Apparatus as claimed in claim 1 wherein the wheel has a hub and the duct is of circular cross-section and has a ring seal at a front edge thereof in order to mate with the wheel hub.

3. Apparatus as claimed in claim 2 wherein the duct is releasably attached to the clamp assembly by a hook assembly which affords pivotal connection between the wheel and the duct, the hook assembly being of adustable length so as to permit the duct to mate closely with the wheel.

4. Apparatus as claimed in claim 1 wherein the fan is an axial flow fan supported in a cylindrical housing of smaller cross-sectional area than the duct and the duct extends from the housing on the input side of the fan.

5. Apparatus as claimed in claim 4 wherein the duct is releasably attached to the clamp assembly by a hook assembly which affords pivotal connection between the wheel and the duct, the hook assembly being of adustable length so as to permit the duct to mate closely with the wheel.

6. Apparatus as claimed in claim 1 wherein the duct is releasably attached to the securing means by a hook assembly which affords pivotal connection between the wheel and the duct, the hook assembly being of adustable length so as to permit the duct to mate closely with the wheel.

7. Apparatus as claimed in claim 6 wherein the duct is made of sheet metal and a mouth of the duct is braced by struts which extend between the mouth of a duct and the fan housing and the hook assembly extends from a cross bar joining a pair of struts to a cross bar on a minor part of the frame.

8. A wheel brake cooling apparatus for an aircraft having at least one aircraft tire on a wheel incorporating a brake assembly, the cooling apparatus comprising:
- a duct adapted to be mounted against the exterior of an aircraft wheel upon which the tire is fitted,
- means for detachably securing said duct against said wheel,
- means for drawing cooling air through the wheel brake assembly via the duct,
- the wheel having a hub and the duct being of a circular cross-section and having a ring seal at a front edge thereof in order to mate with the wheel hub, and
- the duct being releasably attached to the securing means by a hook assembly which affords pivotal connection between the wheel and the duct, the hook assembly being of adjustable length so as to permit the duct to mate closely with the wheel.

9. A wheel brake cooling apparatus for an aircraft having at least one aircraft tire on a wheel incorporating a brake assembly, the cooling apparatus comprising:
- a duct adapted to be mounted against the exterior of an aircraft wheel upon which the tire is fitted,
- means for detachably securing said duct against said wheel,
- means for drawing cooling air through the wheel brake assembly via the duct,
- the means for drawing being an axial flow fan supported in a cylindrical housing of smaller cross-sectional area than the duct and the duct extending from the housing on the inward side of the fan, and
- the duct being releasably attached to the securing means by a hook assembly which affords pivotal connection between the wheel and the duct, the hook assembly being of adjustable length so as to permit the duct to mate closely with the wheel.

10. A wheel brake cooling apparatus for an aircraft having at least one aircraft tire on a wheel incorporating a brake assembly, the cooling apparatus comprising:
- a duct adapted to be mounted against the exterior of an aircraft wheel upon which the tire is fitted,
- means for detachably securing said duct against said wheel, and
- means for drawing cooling air through the wheel brake assembly via the duct,
- The duct being releasably attached to the securing means by a hook assembly which affords pivotal connection between the wheel and the duct, the hook assembly being of adjustable length so as to permit the duct to mate closely with the wheel.

11. Apparatus as claimed in claim 10 wherein the duct is made of sheet metal and a mouth of the duct is braced by struts which extend between the mouth of the duct and a fan housing and the hook assembly extends from a cross bar joining a pair of struts to a cross bar on a minor part of the securing means.

12. Apparatus as claimed in any one of claims 10-9 wherein the securing means comprises a tire-straddling, u-shaped frame with a first tire engaging pad for one side wall of the wheel and the second tire engaging pad for the opposite side wall and means to clamp the pad against the tire.

* * * * *